F. W. ROBERTSHAW.
THERMOSTATIC VALVE.
APPLICATION FILED JULY 15, 1909.
986,760.
Patented Mar. 14, 1911.
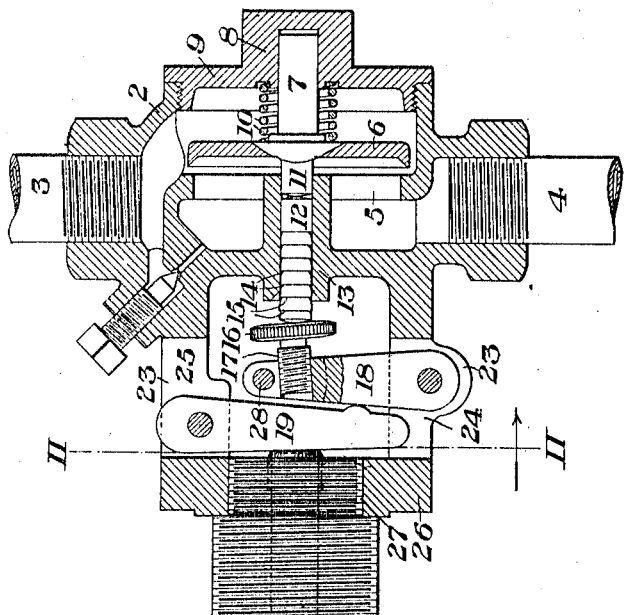
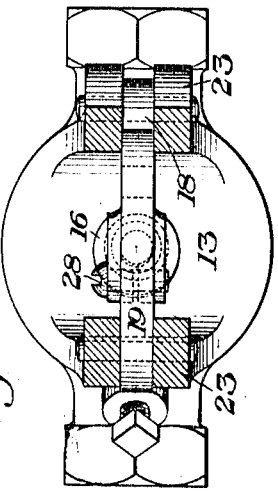
WITNESSES
R A Balderson
G. B. Blsming
INVENTOR
F. W. Robertshaw,
by Bakewell, Byrnes & Parmelee,
his Attys.

UNITED STATES PATENT OFFICE.

FREDERICK W. ROBERTSHAW, OF PITTSBURG, PENNSYLVANIA.

THERMOSTATIC VALVE.

986,760.

Specification of Letters Patent. Patented Mar. 14, 1911.

Application filed July 15, 1909. Serial No. 507,727.

*To all whom it may concern:*

Be it known that I, FREDERICK W. ROBERTSHAW, of Pittsburg, Allegheny county, Pennsylvania, have invented a new and useful Thermostatic Valve, of which the following is a full, clear, and exact description, reference being had to the accompanying drawings, forming part of this specification, in which—

Figure 1 is a longitudinal section of one form of valve embodying my invention; and Fig. 2 is a cross-section on the line II—II of Fig. 1.

My invention has relation to thermostatic valves, and is designed to provide a valve of this type having means of novel character for preventing leakage around the valve stem. Heretofore in the construction of this type of valves, it has been exceedingly difficult to prevent leakage of gas around the valve stem; and the provision of stuffing boxes designed to prevent such leakage has resulted in such an amount of friction upon the valve stem as to seriously interfere with the accuracy of operation; the friction produced being sufficient to materially affect the temperature at which the valve will operate.

My invention is designed to provide a valve having a self-packing stem which will be practically frictionless.

A further object of my invention is to provide means of novel character for adjusting the action of the valve, which shall be readily accessible without disconnecting or disturbing any of the parts.

A still further object is to provide means of novel character for transmitting the movements of the thermostatic elements to the valve.

The precise nature of my invention will be best understood by reference to the drawing, in which I have shown the preferred embodiment thereof, and which will now be described, it being premised, however, that various changes can be made in the details of the construction and arrangement of the parts without departing from the spirit and scope of my invention as defined in the appended claims.

In these drawings, the numeral 2 designates the valve casing or shell, which is provided with the inlet connection 3 and the outlet connection 4, these connections being arranged to communicate with each other through an interior port 5 controlled by the valve 6. The valve 6 is provided with the outwardly projecting stem 7, which is guided in a boss 8 on the outer side of the screw cap 9 which closes the opening in the end of the valve casing through which the valve is introduced. A compression spring 10 is seated between the outer side of the valve and the inner face of the cap, said spring normally acting in the direction to seat the valve. On its inner side the valve is provided with a short stem 11 which contacts with the inner end of a pin or stud 12, which extends into the valve casing and which is loosely seated in the wall 13 of said casing opposite the cap or cover 9. This pin or stud is provided with a plurality of circumferential corrugations 14, each of which has the outwardly facing shoulder 15 at its base. I have discovered that by providing this pin with these corrugations and by filling the same with lubricant, the pin is made practically self-packing so that the leakage of gas around the stem is prevented. This is not only a great advantage in simplifying the construction and doing away with specially provided packing, but it also renders the pin practically frictionless, thereby enabling the valve to operate accurately. The outer end of this pin projects in a position for contact with the head 16 of an adjusting screw 17, which is seated in a centrally arranged multiplying lever 18. 19 is a second multiplying lever having a projection 20 which contacts with the lever 18. The lever 19 is engaged by the inner rod 21 of the thermostat 22. This thermostat is of a well known type, consisting preferably of an outer metallic tube and an inner carbon rod 21, which transmits the thermostatic movements of said tube to the levers 19 and 18, and thereby to the pin 15, and thence to the valve 10. To provide support for the levers 18 and 19, the casing is provided with the two posts or projections 23, the lever 18 being pivoted in a slot 24 in one of said posts or projections, and the lever 19 being similarly pivoted in the slot 25 of the other post or projection. These posts or projections are connected at their outer ends by a bridge 26 provided with a threaded aperture to receive the threaded coupling 27 of the thermostat. The space between the two posts or projections is entirely open from both sides, thereby permitting ready and convenient access to the head of the adjusting screw for the purposes of adjustment. This screw is clamped in its adjusted position by means of a set screw 28 which engages the split inner end of the lever 18.

As will be readily seen, the user can readily adjust the valve to operate at any desired temperature without taking the valve to pieces or disconnecting any of the parts, and without shutting off the flow of gas through the valve.

The pin or stud 15 may, if desired, be formed of one piece with the stem 11 of the valve. I prefer, however, to form it in a separate piece, since the break in the valve stem thus formed enables the parts to more readily adapt themselves to slight differences of alinement. That is to say, a slight difference in exact centering of the pin or stud 15 and the centering of the guide stem 7 of the valve will not interfere with the proper seating of the valve. By increasing the number of corrugations in this separable member of the valve stem, and by elongating its bearing in the casing wall, the degree of self-packing provided may be increased to any desired extent according to the pressure employed.

What I claim is:—

1. In valve mechanism of the character described, a valve casing, a valve member therein, a valve stem projecting exteriorly of the casing, and a guide for said stem, said stem being divided transversely into separate pieces, the piece which is attached to the valve being relatively short and extending but a short distance into the guide, and whereby the valve may adjust itself to its seat, notwithstanding variations in the relation of the axes of the valve and stem, and a thermostatic device arranged to exert a pushing action against the outer end of the other stem section and at least one of said pieces having corrugations thereon within said guide, said corrugations constituting the packing means for the stem; substantially as described.

2. In valve mechanism of the character described, a valve casing, a valve member therein, a valve stem projecting exteriorly of the casing, the casing having a guide for the said stem, and the stem having a series of circumferential corrugations within the guide, said corrugations consisting of a succession of tapered portions terminating in shoulders together with a thermostatic device arranged to act upon the outer end of the stem; substantially as described.

3. In valve mechanism of the character described, a valve casing, a valve seated therein, the casing having a removable cap at one side of the valve and a guide sleeve at the opposite side of the valve, and the valve having oppositely projecting stems one of which is guided in the cap and the other of which seats in the guide sleeve, the stem having a joint within the sleeve together with a thermostatic device arranged to act upon the outer end of the stem; substantially as described.

4. In valve mechanism of the character described, a casing or shell, a valve therein having a stem projecting exteriorly of the casing or shell, multiplying levers adjacent to the end of the stem, one of said levers having an adjusting screw adjustably secured therein, the head of said screw contacting with the valve stem, and a thermostatic element arranged to act upon the other lever; substantially as described.

5. In valve mechanism of the character described, a casing or shell, a valve therein having a stem projecting exteriorly of the casing or shell, multiplying levers adjacent to the end of the stem, one of said levers having an adjusting screw adjustably secured therein, the head of said screw contacting with the valve stem, and a thermostatic element arranged to act upon the other lever, the casing or shell having opposite posts or projections in which said levers are pivoted, said posts or projections having a free opening between them to give access to the levers and adjusting screw; substantially as described.

6. In valve mechanism of the character described, a valve casing having a valve seat, a valve member adapted to said seat, and a guide within which the stem of the valve extends, said stem being divided transversely within the guide into two sections, the joint between said sections being near the inner end of the guide, and forming means to permit the valve to adjust itself to its seat, and a thermostatic element arranged to exert a push action against the outer end of the longer section of said stem, substantially as described.

In testimony whereof, I have hereunto set my hand.

FREDERICK W. ROBERTSHAW.

Witnesses:
H. M. CORWIN,
GEO. H. PARMELEE.